(12) United States Patent  
Echt et al.

(10) Patent No.: US 9,085,123 B2
(45) Date of Patent: Jul. 21, 2015

(54) IONOMER-POLY(VINYLALCOHOL) COATINGS

(75) Inventors: Elliott Echt, Wilmington, DE (US); Richard Allen Hayes, Beaumont, TX (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 378 days.

(21) Appl. No.: 13/407,858

(22) Filed: Feb. 29, 2012

(65) Prior Publication Data

US 2013/0224505 A1    Aug. 29, 2013

(51) Int. Cl.
*B05D 3/02* (2006.01)
*B32B 27/10* (2006.01)

(52) U.S. Cl.
CPC ..................................... *B32B 27/10* (2013.01)

(58) Field of Classification Search
None
See application file for complete search history.

(56) References Cited

U.S. PATENT DOCUMENTS

| | | |
|---|---|---|
| 2,313,144 A | 3/1943 | Gomm |
| 2,632,921 A | 3/1953 | Kreidl |
| 2,648,097 A | 8/1953 | Kritchever |
| 2,683,894 A | 7/1954 | Kritchever |
| 2,704,382 A | 3/1955 | Kreidl |
| 3,264,272 A | 8/1966 | Rees |
| 3,296,172 A | 1/1967 | Funck et al. |
| 3,321,819 A | 5/1967 | Walter et al. |
| 3,338,739 A | 8/1967 | Rees |
| 3,355,319 A | 11/1967 | Rees |
| 3,389,109 A | 6/1968 | Harmon et al. |
| 3,472,825 A | 10/1969 | Walter et al. |
| 3,562,196 A | 2/1971 | Bissot |
| 3,644,258 A | 2/1972 | Moore et al. |
| 3,674,896 A * | 7/1972 | Purcell et al. .................. 525/57 |
| 3,798,194 A | 3/1974 | McCann et al. |
| 3,823,108 A | 7/1974 | Bissot |
| 3,872,039 A | 3/1975 | Vaughn et al. |
| 3,896,065 A | 7/1975 | Reardon et al. |
| 3,899,389 A | 8/1975 | Vaughn et al. |
| 3,904,569 A | 9/1975 | Hekal et al. |
| 3,970,626 A | 7/1976 | Hurst et al. |
| 3,983,268 A | 9/1976 | Scharf et al. |
| 4,136,069 A | 1/1979 | Vachon et al. |
| 4,173,669 A | 11/1979 | Ashida et al. |
| 4,181,566 A | 1/1980 | Vaughn et al. |
| 4,329,305 A | 5/1982 | McClain |
| 4,340,659 A | 7/1982 | Whalen-Shaw et al. |
| 4,400,440 A | 8/1983 | Shaw |
| 4,410,655 A | 10/1983 | Funakoshi et al. |
| 4,440,908 A | 4/1984 | McClain |
| 4,508,804 A | 4/1985 | Asao et al. |
| 4,540,736 A | 9/1985 | Herten et al. |
| 4,547,456 A | 10/1985 | Kojima et al. |
| 4,575,532 A | 3/1986 | Schmukler et al. |
| 4,600,746 A | 7/1986 | Schmukler et al. |
| 4,714,728 A | 12/1987 | Graham et al. |
| 4,732,814 A | 3/1988 | Hatada et al. |
| 4,775,713 A | 10/1988 | Homma et al. |
| 4,970,258 A | 11/1990 | Homma et al. |
| 4,978,707 A | 12/1990 | Tanaka et al. |
| 5,082,697 A | 1/1992 | Patton et al. |
| 5,155,157 A | 10/1992 | Statz et al. |
| 5,160,484 A | 11/1992 | Nikoloff |
| 5,192,620 A | 3/1993 | Chu et al. |
| 5,206,279 A | 4/1993 | Rowland et al. |
| 5,244,969 A | 9/1993 | Yamada |
| 5,292,794 A | 3/1994 | Maginnis |
| 5,304,608 A | 4/1994 | Yabuki et al. |
| 5,330,788 A | 7/1994 | Roberts |
| 5,336,528 A | 8/1994 | Bohme |
| 5,358,790 A | 10/1994 | Rüf et al. |
| 5,362,777 A | 11/1994 | Tomka |
| 5,374,687 A | 12/1994 | Cooperman et al. |
| 5,387,635 A | 2/1995 | Rowland et al. |
| 5,409,765 A | 4/1995 | Boettcher et al. |
| 5,419,960 A | 5/1995 | Touhsaent |
| 5,430,111 A | 7/1995 | Recchia et al. |
| 5,445,893 A | 8/1995 | Mueller et al. |
| 5,542,677 A | 8/1996 | Sullivan et al. |
| 5,550,177 A | 8/1996 | Fanta et al. |
| 5,591,803 A | 1/1997 | Sullivan et al. |
| 5,591,806 A | 1/1997 | Recchia et al. |
| 5,688,869 A | 11/1997 | Sullivan |
| 5,993,604 A | 11/1999 | Finlayson et al. |
| 6,013,353 A | 1/2000 | Touhsaent |
| 6,100,336 A | 8/2000 | Sullivan et al. |

(Continued)

FOREIGN PATENT DOCUMENTS

| | | | |
|---|---|---|---|
| EP | 0868363 B1 | 11/2003 | |
| EP | 1163276 B1 | 11/2004 | |

(Continued)

OTHER PUBLICATIONS

Echt et al, U.S. Appl. No. 13/407,829, filed Feb. 29, 2012.

*Primary Examiner* — Sheeba Ahmed

(57) ABSTRACT

Disclosed are methods to form coatings on a substrate, the coatings comprising a blend of a poly(vinyl alcohol) composition comprising a poly(vinyl alcohol) characterized by (i) a hydrolysis level of from about 85 to about 93 mol % and a 4 weight % aqueous viscosity of 15 centipoise (cp) or less; or (ii) a hydrolysis level of about 95 mol % to 100%; and an ionomer comprising a parent acid copolymer that comprises ethylene and about 18 to about 30 weight % of acrylic acid or methacrylic acid, the acid copolymer having a melt flow rate from about 200 to about 1000 g/10 min., wherein about 50% to about 70% of the carboxylic acid groups of the copolymer are neutralized to carboxylic acid salts comprising potassium cations, sodium cations or combinations thereof. Multilayer structures comprising the blend composition on a substrate are also disclosed.

18 Claims, No Drawings

(56) References Cited

U.S. PATENT DOCUMENTS

| | | |
|---|---|---|
| 6,162,852 A | 12/2000 | Honeycutt et al. |
| 6,245,858 B1 | 6/2001 | Sullivan et al. |
| 6,458,897 B1 | 10/2002 | Tokita et al. |
| 6,482,886 B1 | 11/2002 | Finlayson et al. |
| 6,518,365 B1 | 2/2003 | Powell et al. |
| 6,821,373 B1 | 11/2004 | Berlin et al. |
| 6,852,792 B1 | 2/2005 | Capendale et al. |
| 7,279,513 B2 | 10/2007 | Zhang et al. |
| 7,364,800 B2 | 4/2008 | Jesberger et al. |
| 7,470,736 B2 | 12/2008 | Cooper |
| 7,528,080 B2 | 5/2009 | Prieto et al. |
| 7,588,662 B2 | 9/2009 | Lang et al. |
| 2005/0100754 A1 | 5/2005 | Moncla et al. |
| 2005/0271888 A1 | 12/2005 | Moncla et al. |
| 2006/0124554 A1 | 6/2006 | Fechtenkotter et al. |
| 2007/0117916 A1 | 5/2007 | Anderson et al. |
| 2007/0137808 A1 | 6/2007 | Lostocco et al. |
| 2007/0137809 A1 | 6/2007 | Dyer et al. |
| 2007/0137810 A1 | 6/2007 | Dyer et al. |
| 2007/0137811 A1 | 6/2007 | Runge et al. |
| 2007/0137813 A1 | 6/2007 | Nickel et al. |
| 2007/0141323 A1 | 6/2007 | Wevers et al. |
| 2007/0141936 A1 | 6/2007 | Bunyard et al. |
| 2007/0144697 A1 | 6/2007 | Dyer et al. |
| 2007/0243331 A1 | 10/2007 | Strandburg et al. |
| 2007/0284069 A1 | 12/2007 | Dyer et al. |
| 2007/0292705 A1 | 12/2007 | Moncla et al. |
| 2007/0295464 A1 | 12/2007 | Fetner et al. |
| 2007/0295465 A1 | 12/2007 | Dyer et al. |
| 2008/0000598 A1 | 1/2008 | Dyer et al. |
| 2008/0000602 A1 | 1/2008 | Dyer et al. |
| 2008/0041543 A1 | 2/2008 | Dyer et al. |
| 2008/0073045 A1 | 3/2008 | Dyer et al. |
| 2008/0073046 A1 | 3/2008 | Dyer et al. |
| 2008/0118728 A1 | 5/2008 | Magley et al. |
| 2008/0176968 A1 | 7/2008 | VanSumeren et al. |
| 2008/0182040 A1 | 7/2008 | Chereau et al. |
| 2008/0216977 A1 | 9/2008 | Dyer et al. |
| 2008/0230195 A1 | 9/2008 | Lang et al. |
| 2008/0292833 A1 | 11/2008 | Wevers et al. |
| 2008/0295985 A1 | 12/2008 | Moncla et al. |
| 2009/0194450 A1 | 8/2009 | Dabadie et al. |
| 2009/0253321 A1 | 10/2009 | Wevers et al. |
| 2009/0297747 A1 | 12/2009 | Hausmann et al. |

FOREIGN PATENT DOCUMENTS

| | | |
|---|---|---|
| GB | 1243303 | 8/1971 |
| JP | 50135141 A | 10/1975 |
| JP | 60072973 A | 4/1985 |
| JP | 1009338 A | 1/1989 |
| JP | 05075769 A | 3/1993 |
| JP | 06000872 B | 11/1994 |
| JP | 0194124975 | 5/1997 |
| JP | 10006640 A | 1/1998 |
| JP | 11158332 A | 6/1999 |
| JP | 2958102 B2 | 10/1999 |
| JP | 2000328046 A | 11/2000 |
| JP | 2003049035 | 2/2003 |
| JP | 2005075878 A | 3/2005 |
| JP | 2009091426 | 4/2009 |
| WO | 99/10276 A1 | 3/1999 |
| WO | 00/44801 A1 | 8/2000 |
| WO | 2011/058119 A1 | 5/2011 |
| WO | 2011/058121 A1 | 5/2011 |
| WO | 2011/068525 A1 | 6/2011 |

\* cited by examiner

IONOMER-POLY(VINYLALCOHOL) COATINGS

FIELD OF THE INVENTION

The present invention is directed to methods to form coatings comprising blends of ionomers and poly(vinyl alcohol)s on a substrate and multilayer articles comprising the blends.

BACKGROUND OF THE INVENTION

Ionomers of ethylene copolymers with alpha,beta-ethylenically unsaturated carboxylic acids are known in the art, wherein at least a portion of the carboxylic acid groups of the copolymer are neutralized to form carboxylate salts comprising alkali metal, alkaline earth metal or transition metal cations. See for example U.S. Pat. Nos. 3,264,272; 3,338,739; 3,355,319; 5,155,157; 5,244,969; 5,304,608; 5,542,677; 5,591,803; 5,688,869; 6,100,336; 6,245,858; 6,518,365; and U.S. Patent Application Publication 2009/0297747.

Aqueous dispersions of ionomers are also known in the art. See for example U.S. Pat. Nos. 3,896,065; 3,904,569; 4,136, 069; 4,508,804; 5,409,765; and Japanese Patent Applications JP01009338 and JP05075769. They have been produced by dissolving the acid copolymer precursors in a solvent, neutralization of the acid functionalities with generally ammonia, amines or alkali metal ions, and dilution of the solution into water followed by partial or complete removal of the solvent. See for example U.S. Pat. Nos. 2,313,144; 3,296, 172; 3,389,109; 3,562,196; 5,430,111; 5,591,806; British Patent GB1243303; Japanese Patent Applications JP50084687 and JP2009091426.

Aqueous ionomer dispersions have also been produced by heating acid copolymer precursors or ionomers in hot aqueous ammonia and other neutralizing agents. See for example U.S. Pat. Nos. 3,644,258; 3,674,896; 3,823,108; 3,970,626; 4,540,736; 5,330,788; 5,550,177; U.S. Patent Application Publication 2007/0117916; Japanese Patent Application JP06000872; and PCT Patent Application Publication WO2000/044801.

Aqueous ionomer dispersions have also been produced by dispersing the acid copolymer precursor in aqueous solutions of neutralizing agents at temperatures under high shear process conditions above the boiling point of water, necessitating the use of pressure vessels such as autoclaves and extruders. See for example U.S. Pat. Nos. 4,775,713; 4,970,258; 4,978, 707; 5,374,687; 5,445,893; 7,279,513; 7,528,080; U.S. Patent Application Publications 2005/0100754; 2006/ 0124554; 2007/0141323; 2007/0144697; 2007/0292705; 2007/0295464; 2007/0295465; 2008/0000598; 2008/ 0000602; 2008/0041543; 2008/0073045; 2008/0073046; 2008/0118728; 2008/0135195; 2008/0176968; 2008/ 0182040; 2008/0216977; 2008/0230195; 2008/0292833; 2008/0295985; 2009/0194450; 2009/0253321; European Patent Application EP1163276; PCT Patent Application WO 2011/058119; WO 2011/058121; WO 2011/068525; and Japanese Patent Applications JP2958120; JP10006640; and JP50135141.

Aqueous ionomer dispersions have also been produced by dispersing the ionomer in aqueous solutions under high shear process conditions at temperatures above the boiling point of water, necessitating the use of pressure vessels such as autoclaves and extruders. See for example U.S. Pat. Nos. 4,173, 669; 4,329,305; 4,410,655; 4,440,908; 6,458,897; Japanese Applications JP11158332; JP2000328046; JP2005075878; and PCT Patent Application Publication WO1999/10276.

Aqueous ionomer dispersions have also been produced by dispersing highly neutralized, low melt index (MI) ionomers in hot water. See for example U.S. Pat. Nos. 3,321,819; 3,472, 825; and 4,181,566.

Ammonia-neutralized ionomer aqueous dispersions have been used to coat certain substrates. See for example U.S. Pat. Nos. 3,872,039; 3,899,389; 3,983,268; 4,340,659; 4,400,440; 4,714,728; 5,336,528; and 6,852,792. As is well known in the art, ammonia-neutralized ionomers liberate the ammonia upon drying to reform the parent acid copolymer and are not redispersible in hot water.

Low molecular weight ionomer waxes have been used as temporary coatings removable with hot water. See for example U.S. Pat. No. 5,292,794.

Certain ionomer articles have been dispersed in aqueous caustic solutions. See for example U.S. Pat. No. 6,162,852.

Certain ionomer dispersions have been used as primer coatings for substrates, such as PET, biaxially oriented polypropylene (BOPP) and aluminum foil films. See for example U.S. Pat. Nos. 5,419,960; 6,013,353; 7,364,800; 7,470,736; and U.S. Patent Application Publication 2005/ 0271888.

Highly neutralized ionomer dispersions have been used as fabric or paper treatments. See for example U.S. Pat. Nos. 5,082,697; 5,206,279; and 5,387,635.

Ionomer dispersions, produced through autoclave or extrusion processes, have been used as internal and external paper sizing or paper additives. See for example U.S. Pat. Nos. 5,993,604; 6,482,886; 7,588,662; U.S. Patent Application Publications 2007/0137808; 2007/0137809; 2007/0137810; 2007/0137811; 2007/0137813; 2007/0141936; 2007/ 0243331; and 2007/0284069.

Certain ionomer dispersions have been used in repulpable paper compositions. See for example U.S. Pat. No. 5,160,484.

Blends of aqueous ionomer dispersions with poly(vinyl alcohol) solutions are known in the art. See for example U.S. Pat. Nos. 3,674,896; 3,896,065; 4,547,456; 4,575,532; 4,600, 746; 5,192,620; 5,358,790; 6,821,373; European Patent Application EP 868363; Japanese Applications JPH09124975; JP2003049035; and JP60072973. The blends suffer the shortcoming of a complicated ionomer dispersion process, as disclosed above.

SUMMARY OF THE INVENTION

The invention provides a method to form a coating comprising a blend of ionomer and poly(vinyl alcohol) on a substrate, the method comprising or consisting essentially of (1) providing a blend composition comprising or consisting essentially of (a) about 99 to about 1 weight %, based on the combination of (a) and (b), of a poly(vinyl alcohol) composition comprising or consisting essentially of a poly(vinyl alcohol) characterized by (i) a hydrolysis level of from about 85 to about 93 mol % and a 4 weight % aqueous viscosity at 20° C. of 15 centipoise (cp) or less; or (ii) a hydrolysis level of about 95 mol % to 100%; and (b) about 1 to about 99 weight %, based on the combination of (a) and (b), of an ionomer composition comprising or consisting essentially of a parent acid copolymer that comprises copolymerized units of ethylene and about 18 to about 30 weight % of copolymerized units of acrylic acid or methacrylic acid, based on the total weight of the parent acid copolymer, the acid copolymer having a melt flow rate (MFR) from about 200 to about 1000 g/10 min., measured according to ASTM D1238 at 190° C. with a 2160 g load, wherein about 50% to about 70% of the carboxylic acid groups of the copolymer, based on the total carboxylic acid content of the parent acid copolymer as calculated for the non-neutralized parent acid copolymer, are neutralized to carboxylic acid salts comprising potassium cations, sodium cations or combinations thereof;

(2) providing a substrate; and (3) coating the blend composition onto the substrate.

In one embodiment, the blend composition is provided in the form of an aqueous dispersion comprising or consisting essentially of water and about 0.001 to about 50 weight % of the combination of (a) and (b); the blend composition is coated onto the substrate as the aqueous dispersion and the method further comprises (4) drying the coated substrate at a temperature of about 20 to about 150° C.

In another embodiment, the blend composition is provided in the form of a preformed film comprising or consisting essentially of the combination of (a) and (b); (3) comprises (3a) producing a prelaminate structure comprising the ionomer-polyolefin film layer adjacent to the substrate; and (3b) laminating the ionomer-polyolefin film layer to the substrate at a temperature from about 50 to about 150° C., optionally with applied pressure; and the method further comprises (4) cooling the coated substrate to a temperature of about 20 to about 30° C.

The invention also provides an article or multilayer structure comprising the coated substrate as described above.

DETAILED DESCRIPTION OF THE INVENTION

Unless otherwise defined, all technical and scientific terms used herein have the same meaning as commonly understood by one of ordinary skill in the art to which this invention belongs. In case of conflict, the specification, including definitions, will control.

Although methods and materials similar or equivalent to those described herein can be used in the practice or testing of the invention, suitable methods and materials are described herein.

Unless stated otherwise, all percentages, parts, ratios, etc., are by weight.

When an amount, concentration, or other value or parameter is given as either a range, preferred range or a list of lower preferable values and upper preferable values, this is to be understood as specifically disclosing all ranges formed from any pair of any lower range limit or preferred value and any upper range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

The transitional phrase "consisting essentially of" limits the scope of a claim to the specified materials or steps and those that do not materially affect the basic and novel characteristic(s) of the claimed invention. Where applicants have defined an invention or a portion thereof with an open-ended term such as "comprising," unless otherwise stated the description should be interpreted to also describe such an invention using the term "consisting essentially of".

Use of "a" or "an" are employed to describe elements and components of the invention. This is merely for convenience and to give a general sense of the invention. This description should be read to include one or at least one and the singular also includes the plural unless it is obvious that it is meant otherwise.

In describing certain polymers it should be understood that sometimes applicants are referring to the polymers by the monomers used to produce them or the amounts of the monomers used to produce the polymers. While such a description may not include the specific nomenclature used to describe the final polymer or may not contain product-by-process terminology, any such reference to monomers and amounts should be interpreted to mean that the polymer comprises copolymerized units of those monomers or that amount of the monomers, and the corresponding polymers and compositions thereof.

The term "copolymer" is used to refer to polymers formed by copolymerization of two or more monomers. Such copolymers include dipolymers consisting essentially of two copolymerized comonomers.

As used herein, "disperse," "dispersing" and related terms refer to a process in which solid articles such as pellets of polymer are mixed with water and over a brief period of time disappear into the liquid phase. The terms "aqueous dispersion" and "dispersion" describe a free-flowing liquid with no solids visible to the human eye. No characterization is made regarding the interaction of the polymer molecules with the water molecules in such aqueous dispersions. "Self-dispersible" means that the material disperses readily in hot (80 to 100° C.) water without need for additional dispersants or reagents.

Viscosity is a measure of the resistance of a fluid to being deformed by either shear or tensile stress. In everyday terms for fluids only, viscosity may be thought of as "thickness" or "internal friction". For example, water is "thin", having a lower viscosity, while honey is "thick", having a higher viscosity. The less viscous a fluid is, the greater its ease of movement (fluidity). As used herein, viscosity refers to dynamic or absolute viscosity.

As used herein, the terms "poly(vinyl alcohol)" and "PVOH" refer generally to poly(vinyl alcohol) homopolymers or copolymers unless specified with more particularity.

The coating methods described herein provides coated substrates using blend compositions comprising ionomers and certain poly(vinyl alcohol)s. The ionomer-poly(vinylalcohol) coating on the substrate as disclosed herein can be in the form of a monolithic membrane that functions as a barrier to penetration of fluids into or through the substrate. Monolithic membranes have high water-entry pressure and are waterproof and liquidproof. The coating also allows for providing a heat-sealable surface on a substrate that is not heat-sealable. Printing properties may be improved by altering the surface of the paper to make it more hydrophobic by the coating.

Articles comprising the coated substrate provide easily recyclable articles of commerce, for example, through repulping of the coated paper, paperboard and the like.

Blend compositions comprising certain ionomer-poly(vinyl alcohol) combinations are disclosed in co-pending U.S. application Ser. No. 13/407,829, incorporated by reference herein. These blend compositions include aqueous dispersions.

Poly(Vinyl Alcohol) Composition

The blends and aqueous dispersions contain poly(vinyl alcohol) compositions comprising or consisting essentially of a poly(vinyl alcohol) wherein the poly(vinyl alcohol) is characterized by (i) a hydrolysis level of from about 85 to about 93 mol % and a 4 weight % aqueous viscosity of 15 centipoise (cp) or less; or (ii) a hydrolysis level of about 95 mol % to 100%.

The combination of the hydrolysis level and the 4 weight % aqueous viscosity of the poly(vinyl alcohol) composition provides the desirable solubility/dispersibility attributes needed to form aqueous dispersions when blended with ionomers.

Poly(vinyl alcohol) compositions can be obtained by known and conventional methods. Poly(vinyl alcohol) compositions are typically obtained through polymerization of vinyl acetate monomer, followed by conversion of the as-made poly(vinyl acetate) composition to the poly(vinyl alcohol) composition through alcoholysis or hydrolysis processes. The poly(vinyl alcohol) products are typically referred to as "hydrolyzed" or "saponified".

It is common to use the term "partially hydrolyzed" or "partially saponified" when not all the acetate groups are completely converted to alcohol groups, such as those with hydrolysis levels of about 85 to about 93 mol %. When poly(vinyl acetate) homopolymer is only partially hydrolyzed, the resulting poly(vinyl alcohol) is actually a vinyl alcohol/vinyl acetate copolymer. However, as noted, such polymers are generally referred to as partially hydrolyzed poly(vinyl alcohol) homopolymers.

Some partially hydrolyzed poly(vinyl alcohol) compositions when combined with the ionomers described below provide aqueous dispersions under the mild conditions described in U.S. application Ser. No. 13/407,829. The degree of hydrolysis of the poly(vinyl alcohol) composition useful in preparing such aqueous dispersions may be from about 85 to about 93 mol %, preferably from about 85 to about 93 mol % and more preferably from about 87 to about 90 mol %.

The viscosity of poly(vinyl alcohol) as a 4 weight % aqueous solution at 20° C. serves as an industrial standard relating to the degree of polymerization and average molecular weight of the poly(vinyl alcohol) polymer.

The 4 weight % aqueous viscosity at 20° C. of the partially hydrolyzed poly(vinyl alcohol) composition may be 15 centipoise (cp) or less, preferably from about 1 to 15 cp. Of note are partially hydrolyzed poly(vinyl alcohol)s with 4 weight % aqueous viscosity at 20° C. from a lower limit of about 1, 2 or 4 cp to an upper limit of about 10 or 15 cp. Specific partially hydrolyzed poly(vinyl alcohol)s have a hydrolysis level of 87 to 89% and 4 weight % aqueous viscosity at 20° C. of 5 to 6 cp, 8 to 10 cp or 11 to 14 cp.

Highly hydrolyzed poly(vinyl alcohol) compositions when combined with the ionomers described below provide aqueous dispersions under mild conditions described in U.S. application Ser. No. 13/407,829. As used herein, "highly hydrolyzed" refers to poly(vinyl alcohol) polymers with a hydrolysis level of about 95 mol % to 100%, such as between 95 and 97%, or between 95 and 99%, or between 97 and 99%, or greater than 99%. Poly(vinyl alcohol) polymers with a hydrolysis level of 99% or greater are also described herein as "fully hydrolyzed."

Specific poly(vinyl alcohol)s have a hydrolysis level of 95 to 97% and 4 weight % aqueous viscosity at 20° C. of 25 to 30 cp, or a hydrolysis level of greater than 99% and 4 weight % aqueous viscosity at 20° C. of 27 to 33 cp.

Optionally, poly(vinyl alcohol) copolymers are also useful for forming aqueous dispersions with ionomers, provided they have the hydrolysis and viscosity attributes described above. The term "copolymer" in this regard is used herein for materials which result from hydrolysis of a vinyl acetate copolymer also containing units derived from a monomer other than vinyl acetate, such an alkyl acrylate, including for example methyl acrylate or methyl methacrylate.

The PVOH materials are described in greater detail in U.S. application Ser. No. 13/407,829.

Ionomer Composition

The ionomer used herein is derived from certain parent acid copolymers comprising copolymerized units of ethylene and about 18 to about 30 weight % of copolymerized units of an alpha, beta-ethylenically unsaturated carboxylic acid such as acrylic acid or methacrylic acid. Preferably, the parent acid copolymer used herein comprises about 19 to about 25 weight %, or more preferably about 19 to about 23 weight %, of the alpha, beta-ethylenically unsaturated carboxylic acid, based on the total weight of the copolymer.

Preferably, the alpha, beta-ethylenically unsaturated carboxylic acid is methacrylic acid. Of note are acid copolymers consisting essentially of copolymerized units of ethylene and copolymerized units of the alpha, beta-ethylenically unsaturated carboxylic acid and 0 weight % of additional comonomers; that is, dipolymers of ethylene and the alpha, beta-ethylenically unsaturated carboxylic acid. Preferred acid copolymers are ethylene methacrylic acid dipolymers.

The parent acid copolymers used herein preferably have a melt flow rate (MFR) of about 200 to about 1000 grams/10 min as measured by ASTM D1238 at 190° C. using a 2160 g load. Alternatively, the parent acid copolymers have MFR from a lower limit of 200, 250 or 300 to an upper limit of 400, 500, 600 or 1000. The preferred melt flow rate of the parent acid copolymer provides ionomers that allow for rapid self-dispersion in hot water. Ionomers derived from parent acid copolymers with melt flow rates below about 200 grams/10 minutes have minimal hot water self-dispersibility, while ionomers derived from parent acid copolymer with melt flow rates of greater than about 1000 grams/10 minutes may reduce the physical properties in the intended enduse.

In some embodiments, blends of two or more ethylene acid copolymers may be used, provided that the aggregate components and properties of the blend fall within the limits described above for the ethylene acid copolymers. For example, two ethylene methacrylic acid dipolymers may be used such that the total weight % of methacrylic acid is about 18 to about 30 weight % of the total polymeric material and the melt flow rate of the blend is about 200 to about 1000 grams/10 min.

The ionomers disclosed herein are produced from the parent acid copolymers, wherein from about 50 to about 70%, or preferably from about 55 to about 60%, such as about 60%, of the total carboxylic acid groups of the parent acid copolymers, as calculated for the non-neutralized parent acid copolymers, are neutralized to form carboxylic acid salts with sodium ions, potassium ions or mixtures thereof. Preferably, the ionomers disclosed herein are produced from the parent acid copolymers wherein the carboxylic acid groups of the parent acid copolymers are neutralized to form carboxylic acid salts with sodium ions.

Importantly, the ionomer compositions combine the properties of being self-dispersible in hot water along with being thermoplastic. Preferably, the ionomers used herein have a melt flow rate (MFR) of at least 1 gram/10 min, such as about 1 to about 20 grams/10 min as measured by ASTM D1238 at 190° C. using a 2160 g load. More preferably, the ionomer composition has a MFR of about 1 to about 10 grams/10 min, and most preferably a MFR of about 1 to about 5 grams/10 min. The combination of the above described parent acid copolymer melt flow rates and the neutralization levels provides ionomers that combine the properties of being easily self-dispersible in hot water and easily melt fabricated. Preferably, the ionomer composition comprises at least 11 weight % methacrylic acid salt and has a MFR of at least 1 g/10 min.

In some embodiments, blends of two or more ionomers may be used, provided that the aggregate components and properties of the blend fall within the limits described above for the ionomers.

The ionomer materials are described in greater detail in U.S. application Ser. No. 13/407,829.

The PVOH and ionomer can be combined into blend compositions, including aqueous dispersions, by methods described in U.S. application Ser. No. 13/407,829. The blend composition comprises or consists essentially of a combination of about 1 to about 99 weight % of a poly(vinyl alcohol) composition and 99 to about 1 weight % of an ionomer composition, wherein the ionomer and poly(vinyl alcohol) are as described above.

Of note are compositions wherein the ionomer is present in the combination in an amount from a lower limit of about 10, 20, 30, 40 or 50 weight % to an upper limit of about 60, 70, 80, 90, or 95 weight %, the poly(vinyl alcohol) being present in a complementary amount. Also of note are compositions wherein the ionomer is present in the combination in an amount from a lower limit of about 60, 70, or 75 weight % to an upper limit of about 80, 85, 90 or 95 weight %, the poly(vinyl alcohol) being present in a complementary amount.

In some embodiments, the dispersion method comprises providing a preformed aqueous solution of a poly(vinyl alcohol) composition and mixing it with a preformed aqueous dispersion of an ionomer composition.

The ionomer-PVOH composition may also contain other additives known in the art. The additives may include, but are not limited to, processing aids, flow enhancing additives, lubricants, pigments, dyes, flame retardants, impact modifiers, nucleating agents, anti-blocking agents such as silica, thermal stabilizers, UV absorbers, UV stabilizers, surfactants, chelating agents, and coupling agents.

Substrate Materials

The substrate may be any material providing support, shape, esthetic effect, protection, surface texture, bulk volume, weight, or combinations of two or more thereof to enhance the functionality and handability of the structure. Essentially any substrate material known in the art may be used.

Any support or substrate meeting these desired characteristics may be used with the ionomer-PVOH composition. Cellulosic materials such as paper webs (for example Kraft or rice paper), materials made from synthetic fiber spun fabrics, nonwoven textiles, films, open-cell foams, closed-cell foams, microporous films, or even perforated films having large percentages of open areas such as perforated PE films, may be used as materials for the substrate(s), for example. Metallic foils such as aluminum foil may also be used as substrates.

Cellulosic materials include paper, paperboard, cardboard, and pulp-molded shapes. Paper, paperboard, cardboard and the like refer to physical forms derived from cellulose or its derivatives that have been processed as a pulp and formed by heat and/or pressure into sheets. Paper describes thin sheets made from cellulose pulp that are somewhat flexible or semi-rigid. In general, paperboard and cardboard are thicker, rigid sheets or structures based on paper. Typically, a paperboard is defined as a paper with a basis weight above 224 g/m². In accordance with the present disclosure, the paper layer or paperboard layer used in the substrate may have a thickness of about 30-600 µm and a basis weight of about 25-500 g/m², or 100-300 g/m². Cardboard can be a monolithic sheet or can have a more complex structure, such as corrugation. Corrugated cardboard comprises a sheet of corrugated paper adhesively sandwiched between two flat sheets of paper. A coating of the ionomer-PVOH blend may be useful as an adhesive for producing the corrugated cardboard. Pulp-molded shapes are typically nonplanar shapes in which the cellulosic pulp is molded into a rigid shape by application of pressure and/or heat. An example pulp-molded shape is an egg carton.

Example substrates also include a textile or porous sheet material. A textile may also include nonwoven textiles prepared from polypropylene, polyethene, polyesters such as polyethylene terephthalate or mixtures thereof, and other spunbonded polymer fabrics. Sheets made from synthetic fiber spun fabrics, such as nonwoven textiles, may be used as a textile substrate. Cloth that is woven, knitted or the like is also suitable as a textile substrate. Natural fibers alone or in combination with man-made fibers can also be used in textile substrates. A fabric may comprise flame retardant(s), filler(s), or additive(s) disclosed above.

The substrate material may be in the form of a film, sheet, woven fabric, nonwoven fabric and the like. The substrate material may be unoriented or oriented, such monoaxially- or biaxially-oriented. The substrate material may comprise a polymeric or a metal composition. The substrate may be treated to enhance, for example, adhesion with the coating. The treatment may take any form known in the art such as for example, adhesive, primer or coupling agent treatments or surface treatments, such as chlorine treatments, flame treatments (see, e.g., U.S. Pat. Nos. 2,632,921; 2,648,097; 2,683,894; and 2,704,382), plasma treatments (see e.g., U.S. Pat. No. 4,732,814), electron beam treatments, oxidation treatments, chemical treatments, chromic acid treatments, hot air treatments, ozone treatments, ultraviolet light treatments, sand blast treatments, solvent treatments or corona treatments and combinations of the above.

Specific examples of substrate materials include poly(ethylene terephthalate) (PET) films, biaxially-oriented poly(propylene) (BOPP) films, polyamide films, aluminum foil, paper, paperboard, and the like. Preferably, the substrate material is paper, paperboard and the like to allow for repulpability after use.

The substrate material may be any thickness, but generally range from about 0.1 to about 20 mils thick, more generally from about 0.5 to about 10 mils thick.

Methods to form a coating comprising a blend of ionomer and poly(vinyl alcohol) on a substrate comprise or consist essentially of (1) providing a blend composition comprising or consisting essentially of the PVOH and ionomers described above; (2) providing a substrate described above; and (3) coating the blend composition onto the substrate.

Coating methods include embodiments where the blend combination is in the form of an aqueous dispersion, extrusion coating wherein the blend combination is in molten form and lamination methods wherein the blend combination is in the form of a preformed film.

Dispersion Coating Method

One embodiment of the coating method is wherein the blend composition is in the form of an aqueous ionomer-poly(vinyl alcohol) dispersion comprising or consisting essentially of water and about 0.001 to about 50 weight % of the combination of (a) and (b) described above. In this embodiment, providing the blend composition may comprise or consist essentially of (1a) providing an aqueous poly(vinyl alcohol) solution comprising or consisting essentially of water and the poly(vinyl alcohol) composition described in (a) above; (1b) providing an ionomer composition comprising or consisting essentially of the ionomer composition described in (b) above; (1c) mixing the ionomer composition with the aqueous poly(vinyl alcohol) composition solution optionally with heating; and (1d) optionally cooling the heated aqueous blend dispersion to a temperature of about 20 to 30° C., wherein the combination remains dispersed in the liquid phase. This embodiment further comprises (4) drying the coated substrate at a temperature of about 20 to about 150° C.

Methods to produce aqueous dispersions comprising certain ionomer-poly(vinyl alcohol) combinations are disclosed in greater detail in copending U.S. application Ser. No. 13/407,829. In contrast, previous methods required significantly more rigorous conditions to form dispersions. The dispersion methods provide process simplifications that require less energy and are inherently safer than disclosed in the prior art dispersion methods, such as high pressure, high shear, autoclave processes or extrusion processes.

The methods include providing the blend composition by (1a) providing an aqueous poly(vinyl alcohol) solution comprising water and the poly(vinyl alcohol); (1b) providing an ionomer composition comprising the ionomer; (1c) mixing the ionomer composition with the aqueous poly(vinyl alcohol) composition solution optionally with heating; and (1d) optionally cooling the heated aqueous blend dispersion to a temperature of about 20 to 30° C., wherein the combination remains dispersed in the liquid phase.

In some embodiments, the dispersion method comprises or consists essentially of providing a preformed aqueous solution of a poly(vinyl alcohol) composition and mixing it with a preformed aqueous dispersion of an ionomer composition. For example, (1a) comprises heating a mixture of water and the poly(vinyl alcohol) composition to provide the aqueous poly(vinyl alcohol) solution, optionally followed by cooling to a temperature of about 20 to about 30° C.; and (1b) comprises providing an aqueous ionomer composition by mixing a solid ionomer composition with water heated to a temperature from about 80 to about 100° C. to provide a heated aqueous ionomer composition dispersion; optionally followed by cooling to a temperature of about 20 to about 30° C., wherein the ionomer remains dispersed in the aqueous phase.

In other embodiments, the ionomer in solid form, such as melt cut pellets, may be mixed with the aqueous poly(vinyl alcohol) solution with heating to prepare the blend dispersion.

In one such embodiment, the method comprises or consists essentially of (1a) heating a mixture of water and a poly(vinyl alcohol) composition described above to provide an aqueous poly(vinyl alcohol) solution optionally followed by cooling to a temperature of about 20 to about 30° C.; (1b) providing the ionomer composition comprising or consisting essentially of the ionomer in solid form; (1c) heating the aqueous poly(vinyl alcohol) solution to a temperature from about 80 to about 100° C. (under low shear conditions); (1d) contacting the solid ionomer composition with the heated aqueous poly (vinyl alcohol) solution; (1e) continuing heating at a temperature from about 80 to about 100° C. (under low shear conditions) until the solid ionomer composition has completely dispersed; and (1f) optionally cooling to a temperature of about 20 to 30° C.

In another such embodiment, the method comprises or consists essentially of (1a) heating a combination of a poly (vinyl alcohol) composition described above with water to provide an aqueous poly(vinyl alcohol) composition solution; (1b) providing the ionomer composition comprising or consisting essentially of the ionomer described above in solid form; (1c) contacting the solid ionomer composition with the aqueous poly(vinyl alcohol) solution to provide a mixture; (1d) heating the mixture to a temperature from about 80 to about 100° C. (under low shear conditions) until the solid ionomer composition has completely dispersed; and (1e) optionally cooling to a temperature of about 20 to 30° C.

The dispersion coating composition may include other additives known in the art. For example, the composition may include a wax additive, such as a microcrystalline wax or a polyethylene wax, which serves as an anti-blocking agent as well as to improve the coefficient of friction of the final coated substrate. Other types of additives include fumed silica, which reduces the tack of the coating at room temperature, fillers, cross-linking agents, anti-static agents, defoamers, dyes, brighteners, processing aids, flow enhancing additives, lubricants, dyes, pigments, flame retardants, impact modifiers, nucleating agents, anti-blocking agents, thermal stabilizers, UV absorbers, UV stabilizers, surfactants, chelating agents, and coupling agents and the like.

Inorganic fillers include calcium carbonate, titanium dioxide, silica, talc, barium sulfate, carbon black, ceramics, chalk or mixtures thereof. Organic fillers include natural starch, modified starch, chemically modified starch, rice starch, corn starch, wood flour, cellulose, and mixtures thereof.

Starch is a natural product composed of various amounts of amylose and amylopectin. As used herein "starch" refers generally to starch, starch derivatives, modified starch, thermoplastic starch, cationic starch, anionic starch, starch esters, such as starch acetate, starch hydroxyethyl ether, alkyl starches, amine starches, phosphate starches and dialdehyde starches. Important plant source of starch used in the paper industry are potato, barley, wheat corn, waxy maize (corn with no amylose in the starch), and tapioca.

Starch can be modified in a number of ways. The viscosity of the starch can be reduced by use of enzymes, thermal treatment, ammonium persulfate, hypochlorite, or acid. In addition, the starch can be chemically modified, for example via hydroxyethylation, carboxymethylation, acetylation, or phosphatizing. Thermoplastic starch may be produced, for example, as disclosed within U.S. Pat. No. 5,362,777, which discloses the mixing and heating of native or modified starch with high boiling plasticizers, such as glycerin or sorbitol, in such a way that the starch has little or no crystallinity, a low glass transition temperature and a low water content.

Once prepared, the ionomer-PVOH composition may be coated onto a substrate as described below.

In some embodiments the polymer composition can be coated directly on a substrate using impregnation and coating techniques. For example, the ionomer composition is a coating applied directly on the substrate (via spraying, painting or other appropriate application methods). Such coating can be applied using spreading methods known in the art such as with a rubber doctor blade.

The composition can be applied to one side or both sides of a substrate. In the case where the substrate is coated or laminated on one side, the composition may be applied to the side that is directly exposed to the environment to provide a liquid-impermeable outer surface. Alternatively, in applications where mechanical wear or abrasion is likely, the composition may be applied to the side of the substrate opposite the side exposed to the mechanical wear to afford protection of the polymeric composition.

In other embodiments the composition can be impregnated in a substrate or the substrate can be impregnated in the polymer.

The ionomer composition may be formed at least partially in the substrate by impregnating the substrate with the coating composition as an aqueous dispersion and then drying the composition while it is in contact with the pores of the substrate.

The composition can be dispersed throughout the substrate such as a loosely woven fabric where the composition fills gaps in the substrate and does not just adhere on the surface of a substrate. The substrate can be impregnated inside the ionomer-PVOH composition through coating processes to have the ionomer-PVOH compositions on both sides of the substrate.

The coating as an aqueous dispersion can be applied to the substrate in any suitable manner known in the art, including gravure coating, roll coating, wire rod coating, dip coating, flexographic printing, spray coating and the like. Excess aqueous dispersion coating composition can be removed by squeeze rolls, doctor knives and the like, if desired.

For the preferred paper and paperboard substrates, the substrates may be applied to the preformed paper or paperboard substrate, as described above, or during the manufacture of the paper or paperboard substrates using, for example, size presses, such as a puddle size press, a metering size press, a vertical size press, an inclined size press and a horizontal size press, roll coaters, gate-roll coaters, blade coaters, bill blade coaters, and sprayers to coat the coating composition onto the paper or paperboard substrate.

The coating composition can be applied to one or both sides of the substrate.

After coating the substrate, the aqueous dispersion is dried to provide a solid coating of the ionomer-PVOH blend on the substrate. As used herein, "drying" means removal of water from the aqueous dispersion, such as by evaporation, freeze drying, or the like. Drying may include allowing the dispersion to dry under ambient conditions (temperatures of 20 to 30° C. and atmospheric pressure). Alternatively, drying may include application of elevated temperatures (such as up to 100° C. in an oven or heating tunnel) and/or reduced pressure. Freeze drying involves rapid freezing and drying in a high vacuum.

Non-Dispersion Coating Methods

Another embodiment is wherein the blend composition is in the form of a preformed film. In this embodiment, the invention provides a method to form a coating comprising an ionomer and PVOH on a substrate, the method comprising or consisting essentially of (a) providing a preformed film of an ionomer-PVOH composition as described above;

(b) producing a prelaminate structure comprising the ionomer-PVOH film layer adjacent to a substrate layer;

(c) laminating the ionomer film layer to the substrate layer at a temperature from about 50 to about 150° C. and optionally with applied pressure;

(d) cooling the coated substrate to a temperature of about 20 to about 30° C.

The preformed film of the ionomer-PVOH composition may be produced by any known art method. For example, thin films can be formed by dipcoating; by providing a thin layer of an aqueous ionomer-PVOH dispersion followed by drying; or any other processes known to those skilled in the art.

In the film lamination method, the ionomer-PVOH coating layer can be included in a multilayer structure with one or more layers of additional material(s) to provide a multilayer coating. In such processes, the ionomer-PVOH coating layer may be applied so it is in direct contact with the substrate, or it may be applied so it is in contact with a layer intervening between the substrate and the ionomer-PVOH layer.

The actual making of the multilayer film and corresponding film structures can generally be by any such method as practiced in the art. As such, film and film structures used as a substrate for the ionomer-PVOH composition can be typically cast, extruded, co-extruded and the like including orientation (either axially or biaxially) by various methodologies (e.g., blown film, bubble techniques, mechanical stretching or the like, or lamination). It should be appreciated that various additives as generally practiced in the art can be present in the respective film layers including the presence of tie layers and the like, provided their presence does not substantially alter the properties of the film or film structure. Thus, it is contemplated that various additives such as antioxidants and thermal stabilizers, ultraviolet (UV) light stabilizers, pigments and dyes, fillers, anti-slip agents, plasticizers, other processing aids, and the like may be advantageously employed.

The preformed film of the ionomer-PVOH composition can be applied to one or both sides of the substrate. Preferably, the ionomer-PVOH composition layer has a thickness from about 0.1 mils to about 20 mils, more preferably a thickness from about 0.3 mils to about 10 mils and most preferably a thickness from about 0.5 mils to about 5 mils.

The laminate structures may be produced by any known art method. For example, the prelaminate structure can be produced by plying the preformed film of the ionomer-PVOH composition with the substrate followed by passing through heated nip rolls or through an oven to form the laminate.

In these non-dispersion coating methods, after coating the substrate, the coated substrate is cooled to provide a solid ionomer-PVOH coating on the substrate. As used herein, "cooling" includes allowing the ionomer-PVOH coating to cool under ambient conditions (temperatures of 20 to 30° C. and atmospheric pressure) and/or by application of reduced temperatures such as by use of chill rolls or the like.

Additional layers may be applied to the coated substrate following coating. For example, additional aqueous or solvent-based dispersions not comprising an ionomer-PVOH combination may be applied to the coated substrate. Alternatively, multilayer structures may comprise additional thermoplastic materials applied over the ionomer-PVOH layer by extrusion coating, lamination or the like. In such cases, the ionomer-PVOH coating becomes an inner layer in a multilayer structure.

The ionomer-PVOH coating composition can also be accommodated between two layers of substrate in a sandwich-like manner. Several layer assemblies can also be assembled one above the other. For example, the configuration can comprise the ionomer-PVOH layer, a substrate layer, another ionomer-PVOH layer, another substrate layer, and so on, depending upon desired applications of the structure. Other configurations can comprise variations of the aforementioned sandwich configuration, including a plurality of ionomer-PVOH layers, a plurality of substrate layers, and so forth, including mixtures thereof.

In such cases, in aqueous dispersion coating methods the ionomer coating may be maintained in an aqueous state during assembly of the layered structure, followed by drying. In the resulting layered structures, the ionomer-PVOH coating may function as an adhesive layer to bond substrate layers together.

The coated substrates described herein may be used as film or sheet goods for various end uses. Alternatively, the initially prepared coated substrate may be further treated to provide more finished articles.

For example, the coated substrate may be part of a package comprising the coated substrate. The packages may comprise films or sheets of the coated substrate wrapped around the packaged product and optionally comprising other packaging materials. Packages may also be formed of one or more portions of the coated substrate bonded together, for example by heat sealing. The ionomer-PVOH coating is readily heat sealable, allowing for production of packages comprising a coated paper substrate that does not need additional adhesive for sealing. Such packages or containers may be in the form of pouches, bags, boxes, cartons, cups, packets, and the like.

A film or sheet comprising the coated substrate could be further processed by thermoforming into a shaped article. For example, a film or sheet comprising the coated substrate as described herein could be formed into a shaped piece that could be included in packaging. Thermoformed articles typically have a shape in which a sheet of material forms a concave surface such as a tray, cup, can, bucket, tub, box or bowl. The thermoformed article may also comprise a film or sheet with a cup-like depression formed therein. In some cases, the thermoformed film or sheet is shaped to match the shape of the material to be packaged therein. Flexible films when thermoformed as described retain some flexibility in the resulting shaped article. Thicker thermoformed sheets may provide semi-rigid or rigid articles. Thermoformed articles may be combined with additional elements, such as a generally planar film that serves as a lid sealed to the thermoformed article.

Preferably, the container is suitable for containing, transporting or storing food that may contain grease or oil, including snack foods such as chips, crackers, cookies, cereal or nuts; dry noodles, soup mix, coffee, French fries, sandwiches, pet foods and the like. Frozen or chilled foods such as ice cream, vegetables, waffles and the like may also be packaged in packages comprising the coated substrate. Non-food items such as detergents and soaps may also be packaged in packages comprising the coated substrate. Products for serving foods may also be prepared from the coated substrate such as cold drink cups, plates, bowls and the like.

Pouches are formed from coated web stock by cutting and heat sealing separate pieces of coated web stock and/or by a combination of folding and heat sealing with cutting. Coated substrates may be formed into pouches by overlaying and heat sealing the edges of the substrate to form a seal and then sealing across the lengthwise direction of the tube (transverse seal). Other packages include containers, optionally further comprising lidding films such as cups or tubs prepared from coated substrates as described herein and flexible packages made by laminating the coated substrate to another webstock to improve characteristics such as stiffness and appearance.

Preferred packages comprise one or more of the preferred or notable or structures as described herein. Preferred packaged products comprise one or more of the preferred or notable compositions, films, structures or packages as described herein.

After preparation, the coated substrates can then take advantage of the ready dispersibility of the ionomer-PVOH composition in water, for example to allow for recyclability.

Once used for its intended purpose such as for packaging or serving food, the coated substrate is easily recyclable by treatment with hot water. The ionomer-PVOH coating is readily dispersed in hot water, allowing it to be removed from the substrate.

The process for separating the ionomer-PVOH coating from the substrate materials comprised in containers disclosed herein may include contacting the container with water at a temperature as low as about 80° C. In some embodiments, the temperature is in the range from about 80 to 90° C., or about 80 to 85° C., or about 85 to 90° C. However, one can appreciate that if the water-dispersable ionomer-PVOH compositions can disperse in such temperatures, they can also be dispersed at temperatures above 90° C. Also, in some embodiments, the container may be cut into pieces before being contacted with water.

In normal circumstances, the water-dispersable compositions could be dispersed in warm water in about 1 hour or less, such as in about 30 minutes or less or in about 20 minutes or less. Once the water-dispersible ionomer composition is fully dispersed in the water, the substrate materials can be separated from the aqueous ionomer-PVOH dispersion, such as by filtration. Then the non-water dispersible materials comprised in the container, such as paperboard base material or aluminum foil, could then be separated from the aqueous phase by, for example filtration, for recycling. In some cases, it may not be necessary to separate completely dispersed ionomer-PVOH composition from paper pulp. The fiber can be reused because recycled paper typically contains some small fraction of dispersed "plastic", waxes, hot melt components, etc., and minimal amounts can be tolerated if the particle size is small.

Removing the coating from the substrate materials may involve one of the following embodiments:

The container (preferably after use) disclosed herein is first mixed with water under low shear conditions at room temperature (about 20 to 25° C.) and then the temperature or the mixture is raised to about 80-90° C. The container (preferably after use) disclosed herein is mixed with water under low shear conditions at room temperature and then the temperature of the mixture is raised to about 85-90° C.

The container (preferably after use) disclosed herein is mixed with water that is preheated to a temperature of about 80-90° C. under low shear conditions. The container (preferably after use) disclosed herein is mixed with water that is preheated to a temperature of about 85-90° C. under low shear conditions.

Following treatment with hot water to remove the coating, the substrate materials can be collected and recycled into new articles. For example, paper and paperboard materials can be repulped by methods known in the art and processed into new articles.

The aqueous ionomer-PVOH dispersion can also be further processed to recover the ionomer-PVOH composition. For example, excess water can be removed by distillation, evaporation, freeze drying, or the like to provide the composition in solid form. Alternatively, the ionomer can be purified from other water-soluble materials by subjecting the aqueous dispersion to acid treatment, providing the base ethylene acid copolymer that is insoluble in water. The solid acid copolymer can be re-neutralized according to methods disclosed herein to provide the ionomer.

EXAMPLES

Table 1 summarizes the ethylene methacrylic acid dipolymers with copolymerized units of methacrylic acid at the indicated weight % of the total acid copolymer used to prepare the ionomers in Table 2. Ionomers were prepared from the acid copolymers using standard conditions. Melt flow rate (MFR) was measured according to ASTM D1238 at 190° C. using a 2160 g load. A similar ISO test is ISO 1133.

TABLE 1

| | Methacrylic acid (weight %) | MFR (g/10 min) |
|---|---|---|
| ACR-1 | 19 | 400 |
| ACR-2 | 19 | 250 |
| ACR-3 | 23 | 270 |

Ionomers

Table 2 summarizes the ionomers derived from the ethylene methacrylic acid dipolymers, with the indicated percentage of the carboxylic acid groups neutralized with sodium hydroxide to form sodium salts or potassium carbonate to form potassium salts. The water dispersibility was determined according to the following procedure, which illustrates addition of the non-neutralized acid copolymer or ionomer to heated water. The procedure produced a mixture of water and 10 weight % solid loading (as weighed prior to addition to the water). Into a 1 quart (946.4 ml) metal can placed into a heating mantle element was added 500 ml of distilled water. An overhead paddle stirrer (3-paddle propeller type stirrer) was positioned into the center of the metal can and turned on to provide slow mixing. A thermocouple was positioned below the water surface between the paddle stirrer and the metal can surface. The paddle stirrer was typically set at a speed of about 170 rpm at the beginning of the process and generally raised to about 300 to 470 rpm as the viscosity built during dispersion formation. The distilled water was then heated with an Omega temperature controller to a temperature of 90 C. The ionomer (55.5 grams, in the form of melt cut pellets) indicated in Table 2 was then added in one portion and the resulting mixture was stirred for a total of 20 minutes. The resulting mixture was then allowed to cool to room temperature. For those materials that formed a dispersion at a given temperature (denoted as "Yes" in Table 2), the dispersion was generally formed in less than 10 minutes and was stable even after being cooled to room temperature. As used herein, "stable" means that the dispersion, a liquid with no visible solids, did not exhibit any visual change after the initial cooling or on storage at room temperature. The sample dispersions remained as liquids with no settling after storing at room temperature for periods of several weeks or longer.

TABLE 2

| Ionomer | Base Copolymer | Neutralization Ion | Level (%) | MFR (g/10 min.) | Water Dispersibility at 80° C. | at 90° C. |
|---|---|---|---|---|---|---|
| ION-1 | ACR-1 | Na | 50 | 5.3 | No | Yes |
| ION-2 | ACR-2 | Na | 60 | 1.4 | Yes | Yes |
| ION-3 | ACR-1 | Na | 70 | 1 | — | Yes |
| ION-4 | ACR-3 | Na | 55 | 1.4 | — | Yes |
| ION-5 | ACR-2 | K | 50 | 3.9 | — | Yes |
| ION-6 | ACR-1 | K | 50 | 5.4 | — | Yes |
| ION-7 | ACR-1 | Na | 60 | 1.5 | Yes | Yes |
| ION-8 | ACR-1 | Na | 65 | 1.4 | No | Yes |
| ION-9 | ACR-2 | Na | 65 | 1.1 | No | Yes |

ION-2 and ION-7 demonstrate a surprisingly preferred embodiment of forming dispersions at the lower temperature of 80° C., even though equivalent compositions based on the same parent ethylene acid copolymers with higher neutralization levels (ION-9 and ION-8, respectively) did not demonstrate the same advantage.

Samples of poly(vinyl alcohol) (PVOH) compositions are commercially available from DuPont under the Elvanol® tradename, with their hydrolysis levels and 4 weight ° A) aqueous viscosity at 20° C. reported in Table 3. PVOH-7 is a PVOH copolymer, so it is not characterized in terms of % hydrolysis. However, it is considered fully hydrolyzed, since there are very few acetate groups remaining. PVOH-8 and PVOH-9 were commercially obtained from Chang Chun Petrochemical Co. (CCPC) of Taiwan.

Aqueous solutions of the PVOH materials in Table 3 were prepared by suspending the solid material in cool water and then heating to 90 to 95° C. with stirring until all solid material disappeared. The poly(vinyl alcohol) solutions were clear, transparent solutions.

TABLE 3

| PVOH | Hydrolysis Level (%) | 4 weight % aqueous viscosity at 20° C. (cp) | (weight %) |
|---|---|---|---|
| PVOH-1 | 99+ | 27-33 | 11.5 |
| PVOH-2 | 95-97 | 25-30 | 10.6 |
| PVOH-3 | 87-89 | 5-6 | 12.6 |
| PVOH-4 | 87-89 | 11-14 | 10 |
| PVOH-5 | 87-89 | 8-10 | About 10 |
| PVOH-6 | 99+ | 12-15 | 10 |
| PVOH-7 | Fully hydrolyzed | 24-32 | 10 |
| PVOH-8 | 90-93 | 27-33 | 11.2 |
| PVOH-9 | 95-97 | 25-30 | 10.6 |

Preparative Samples 1-12 and Comparative Samples C1-C4

These samples show the method of mixing preformed aqueous PVOH solutions with a preformed aqueous ionomer dispersion. An 11.6 weight % aqueous dispersion of ION-2 was prepared by suspending the solid material in hot (90 to 95° C.) water and stirring until all solid material disappeared. The ionomer dispersion was a translucent milky liquid.

Blends of the aqueous ionomer dispersion with the aqueous PVOH solutions summarized in Table 3 were prepared by mixing them together at room temperature to prepare the blend compositions summarized in Table 4. Specifically, each of the aqueous PVOH solutions were mixed with the aqueous ionomer dispersion in ratios of 80:20; 60:40; 40:60 and 20:80 (weight:weight).

The viscosities of the Examples and Comparative Examples were measured using a TA Instruments AR 2000 controlled-stress rheometer equipped with narrow-gap (1 mm) concentric cylinder geometry. The concentric cylinder geometry consists of a temperature controlled jacket, a cup (or stator), and a DIN rotor (or bob). When a test is performed, the sample is placed in the cup and then the rotor is inserted. A more cylindrical rotor and often higher rpm is used for very low viscosity fluids such as the ionomer dispersions. Higher viscosity fluids such as the PVOH solutions or the ionomer-PVOH blend dispersions require rotors consisting of a narrow shaft with a disk, run at lower rpm. Since the drag of the fluid on the rotor is proportional to the surface area, the contribution to the measured torque from the shaft of the rotor was small relative to the thick part of the rotor. As a result, the height of the fluid on the shaft was not critical and the cup was filled so that the height of the fluid in the cup was above the thick part of the rotor when the rotor is inserted. A solvent cover was placed over the top of the cup. This helped to minimize the effects of solvent evaporation or moisture absorption on the measured properties.

Instrument bias was checked using a nominal 10 cp (actual viscosity 9.5 cp) and a nominal 10,000 cp (actual viscosity 9860 cp) viscosity standard. The bias was 4% or less for both standards at shear rates from 0.1 to 100 $sec^{-1}$.

The viscosity of each test sample was measured at 25° C. The concentric cylinder geometry was set at the desired test temperature. Proportional amounts of each material for a total of 20 mL were loaded into the cup using a syringe, the solutions were mixed using a spatula for 10 seconds, the DIN was lowered to a gap of 5920 μm between the bottom of the rotor and the cup, a cover was placed over the geometry, and the test was started. A time sweep was performed at a shear rate of 20 $sec^{-1}$. The viscosity for each sample was monitored as a function of time by taking data points every 10 seconds up to 1800 seconds. The measurement was performed at least in duplicate with a fresh sample loading each time and the average values are reported in Table 4 at representative time points. The column entry "Viscosity Ratio" denotes the ratio of the viscosity of the ionomer-PVOH blend dispersion to the viscosity of the PVOH dispersion without ionomer, each measured at 1800 seconds.

TABLE 4

| Sample | Composition (weight % in water) | Viscosity (cp) after time (seconds) | | | | | | Viscosity Ratio |
|---|---|---|---|---|---|---|---|---|
| | | 10 | 100 | 500 | 1000 | 1500 | 1800 | |
| C1 | ION-2 (11.6) | 3 | 3 | 2 | 2 | 2 | 2 | — |
| C2 | PVOH-1 (11.5) | 792 | 773 | 767 | 767 | 766 | 766 | — |
| 1 | PVOH-1 (9.2) ION-2 (2.3) | 368 | 373 | 399 | 423 | 448 | 463 | 0.6 |
| 2 | PVOH-1 (6.9) ION-2 (4.6) | 152 | 156 | 172 | 187 | 201 | 211 | 0.28 |
| 3 | PVOH-1 (4.6) ION-2 (7.0) | 51 | 52 | 58 | 63 | 67 | 70 | 0.09 |
| 4 | PVOH-1 (2.3) ION-2 (9.3) | 15 | 15 | 16 | 17 | 18 | 19 | 0.03 |
| C3 | PVOH-2 (10.6) | 484 | 478 | 476 | 476 | 476 | 476 | — |
| 5 | PVOH-2 (8.5) ION-2 (2.3) | 415 | 423 | 455 | 492 | 534 | 562 | 1.18 |
| 6 | PVOH-2 (6.4) ION-2 (4.6) | 328 | 338 | 386 | 440 | 510 | 560 | 1.17 |
| 7 | PVOH-2 (4.2) ION-2 (7.0) | 247 | 260 | 319 | 382 | 455 | 510 | 1.07 |
| 8 | PVOH-2 (2.1) ION-2 (9.3) | 118 | 124 | 156 | 185 | 215 | 236 | 0.49 |
| C4 | PVOH-3 (12.6) | 32 | 31 | 31 | 31 | 31 | 31 | — |
| 9 | PVOH-3 (10.1) ION-2 (2.3) | 28 | 27 | 27 | 28 | 28 | 28 | 0.91 |
| 10 | PVOH-3 (7.6) ION-2 (4.6) | 27 | 27 | 28 | 29 | 29 | 30 | 0.96 |
| 11 | PVOH-3 (5.0) ION-2 (7.0) | 30 | 30 | 31 | 33 | 35 | 37 | 1.19 |
| 12 | PVOH-3 (2.5) ION-2 (9.3) | 23 | 22 | 23 | 25 | 26 | 27 | 0.87 |

Table 5 summarizes a similar comparison using a 10 weight % aqueous solution of PVOH-4 blended with a 10 weight % aqueous dispersion of ION-2. Viscosity measurements on ION-2 were run at 100 rpm and 20° C. using a cylindrical rotor and the PVOH-4 and the blend at 60 rpm and 20° C. using a rotor consisting of a shaft with a disc.

TABLE 5

| Sample | Composition (weight % in water) | Viscosity (cp) after time (seconds) | | | | | | | Viscosity Ratio |
|---|---|---|---|---|---|---|---|---|---|
| | | 0 | 300 | 600 | 900 | 1200 | 1500 | 1800 | |
| C5 | ION-2 (10) | — | — | — | — | — | — | 5.2 | — |
| C6 | PVOH-4 (10) | — | — | — | — | — | — | 236 | — |
| 13 | PVOH-4 (6) ION-8 (4) | 229 | 209 | 211 | 229 | 214 | 205 | 206 | 0.87 |

The viscosity behavior for the 60:40 blend of PVOH-4 and ION-2 was similar to the behavior of the other samples. Similar viscosity behavior was also observed for blends of PVOH-6, PVOH-7, PVOH-8 and PVOH-9 with ION-2 in aqueous dispersions.

Coating Examples 1-24 and Comparative Examples C1-C7

These examples, summarized in Tables 6 and 7, demonstrate coating paperboard with aqueous dispersions. Aqueous ionomer-PVOH dispersions were prepared according to the general procedure above. The substrate was a 0.22-inch caliper, nominal 77-pound basis weight paperboard coated on one side with clay for printability commercially available as CartonMate® Bleached Board from RockTerm Converting Company, Demopolis Ala. An 8-inch by 11-inch sample of the substrate was coated on the side opposite to the clay coating in the following manner: The sample was weighed and then attached to a flat piece of plywood with a spring loaded clip at one end. Approximately 80 ml of the ionomer-PVOH dispersion prepared as above was applied to the clipped end and the dispersion spread and smoothed with a wire-wound 0036 Meyer rod in one motion to cover the remaining portion of the paper sample. The excess dispersion was removed in the spreading operation. Because of the difficulty in drying to constant weight, the dry coating weight pickup was estimated by immediately reweighing the sample to determine the wet coating weight and calculating the amount of polymer present from the weight % of the dispersion. Depending on the diameter of the wire wound around the rod, the coating weight may be about 4 to about 12 grams per square meter. In these examples, the coating weight was about 6 to about 12 grams per square meter.

The wet coated sample was dried in a forced air oven set at 100° C. for five minutes. After drying the sample was allowed to cool at room temperature and then further conditioned as required for additional testing. The ionomer-PVOH coatings appeared colorless, uniform and slightly glossier than an uncoated control.

TABLE 6

| Example | Weight ratio | | Dry Weight | Wet Weight | Dry Pickup | | |
|---|---|---|---|---|---|---|---|
| | ION-2 | PVOH | | | g | % | g/m² |
| C1 | 100 | 0 | 24.29 | 29.69 | 0.540 | 2.22 | 8.47 |
| C2 | 0 | PVOH-6 100 | 24.80 | 28.82 | 0.402 | 1.62 | 6.18 |
| C3 | 0 | PVOH-6 100 | 24.40 | 29.28 | 0.488 | 2.00 | 7.62 |
| 1 | 20 | PVOH-6 80 | 24.34 | 28.21 | 0.387 | 1.59 | 6.06 |
| 2 | 20 | PVOH-6 80 | 24.41 | 28.12 | 0.371 | 1.52 | 5.79 |
| 3 | 40 | PVOH-6 60 | 24.44 | 28.97 | 0.453 | 1.85 | 7.06 |
| 4 | 40 | PVOH-6 60 | 24.48 | 28.35 | 0.387 | 1.58 | 6.02 |
| 5 | 60 | PVOH-6 40 | 24.35 | 30.12 | 0.577 | 2.37 | 9.03 |
| 6 | 60 | PVOH-6 40 | 24.63 | 29.72 | 0.509 | 2.07 | 7.87 |
| 7 | 80 | PVOH-6 20 | 24.54 | 30.78 | 0.624 | 2.54 | 9.69 |
| 8 | 80 | PVOH-6 20 | 24.44 | 30.19 | 0.575 | 2.35 | 8.96 |
| C4 | 0 | PVOH-7 100 | 24.51 | 28.64 | 0.413 | 1.69 | 6.42 |
| C5 | 0 | PVOH-7 100 | 24.47 | 30.46 | 0.599 | 2.45 | 9.33 |
| 9 | 20 | PVOH-7 80 | 25.30 | 29.81 | 0.451 | 1.78 | 6.79 |
| 10 | 20 | PVOH-7 80 | 25.58 | 33.15 | 0.757 | 2.96 | 11.28 |
| 11 | 40 | PVOH-7 60 | 24.64 | 28.83 | 0.419 | 1.70 | 6.48 |
| 12 | 40 | PVOH-7 60 | 24.76 | 29.01 | 0.425 | 1.72 | 6.54 |
| 13 | 60 | PVOH-7 40 | 24.45 | 29.35 | 0.490 | 2.00 | 7.64 |
| 14 | 60 | PVOH-7 40 | 24.46 | 29.34 | 0.488 | 2.00 | 7.60 |
| 15 | 80 | PVOH-7 20 | 24.28 | 29.39 | 0.511 | 2.10 | 8.02 |
| 16 | 80 | PVOH-7 20 | 24.48 | 30.92 | 0.644 | 2.63 | 10.02 |

TABLE 7

| Example | Volume ratio (%) | | Weight ratio (%) | | Dry Weight | Wet Weight | Dry Pickup | | |
|---|---|---|---|---|---|---|---|---|---|
| | ION-2 | PVOH | ION-2 | PVOH | | | g | % | g/m² |
| C6 | 0 | PVOH-8 100 | 0 | 100 | 22.05 | 25.44 | 0.372 | 1.69 | 6.44 |
| 17 | 20 | PVOH-8 80 | 22 | 78 | 25.04 | 30 | 0.54 | 2.18 | 8.30 |
| 18 | 40 | PVOH-8 60 | 43 | 57 | 24.87 | 29.47 | 0.51 | 2.03 | 7.75 |
| 19 | 60 | PVOH-8 40 | 63 | 37 | 24.62 | 29.64 | 0.55 | 2.24 | 8.55 |
| 20 | 80 | PVOH-8 20 | 82 | 18 | 24.6 | 29.69 | 0.56 | 2.28 | 8.67 |
| C7 | 0 | PVOH-9 100 | 0 | 100 | 21.33 | 25.49 | 0.458 | 2.15 | 8.17 |
| 21 | 20 | PVOH-9 80 | 23 | 77 | 24.62 | 29.15 | 0.50 | 2.02 | 7.71 |

TABLE 7-continued

| Example | Volume ratio (%) ION-2 | PVOH | Weight ratio (%) ION-2 | PVOH | Dry Weight | Wet Weight | Dry Pickup g | % | g/m² |
|---|---|---|---|---|---|---|---|---|---|
| 22 | 40 | PVOH-9 60 | 44 | 56 | 25.25 | 30.49 | 0.58 | 2.28 | 8.70 |
| 23 | 60 | PVOH-9 40 | 64 | 36 | 24.72 | 29.26 | 0.50 | 2.02 | 7.70 |
| 24 | 80 | PVOH-9 20 | 83 | 17 | 25.4 | 30.43 | 0.55 | 2.18 | 8.30 |

The coated samples were tested in the Kit test (TAPPI T 559) for grease resistance. The Kit test uses a series of mixed solvents, combinations of castor oil, n-heptane and toluene, numbered from 1 (100% castor oil) to 12 (45/55 ratio of toluene/n-heptane), in order of decreasing viscosity and surface tension. The reported number is the highest number solvent that shows no sign of staining the tested material after 15 seconds of contact.

The coated samples were also tested in the Cobb test (TAPPI T 441) for water resistance. This test measures the weight gain due to water absorption under standard conditions. The Cobb test time can be varied according to the paper type. The test used herein used was conducted by pouring 100 ml of water onto a paper sample clamped under a ring enclosing 100 square centimeters and pouring off the water after two minutes exposure. The weight gain is multiplied by 100 to report the results in grams/square meter.

The results of both Kit and Cobb tests are summarized in Table 8, reported as the average of two samples. The uncoated substrate had very poor results in the Kit test for grease resistance and relatively high water absorption in the Cobb test. The substrate coated with an aqueous dispersion of ION-2 alone (Comparative Example C1) showed improvement over the uncoated substrate in both Kit and Cobb tests. Substrates coated with PVOH-6 alone (Comparative Examples C3 and C4) had better results in the Kit test than those coated with the ionomer, but absorbed more water. Examples 1-8, coated with aqueous dispersions of ionomer and PVOH-6 provided excellent grease resistance, as indicated by the high scores in the Kit test, and provided reduced water absorption compared to the uncoated substrate. The Kit test results are surprisingly superior to that expected from a weighted average of the substrates coated with ionomer or PVOH-6 alone. The results of samples coated with blends of ION-2 with PVOH-7, PVOH-8 and PVOH-9 were similar. In general, excellent grease resistance could be obtained with PVOH:ionomer ratios from about 10:90 to about 40:60, while providing the best water absorption resistance.

TABLE 8

| Example | Kit Test | 2 minute Cobb Test, g/m² |
|---|---|---|
| Uncoated Substrate | 0 | 36 |
| C1 | 6 | 5 |
| C2 and C3 | 9 | 42 |
| 1 and 2 | 11 | 34 |
| 3 and 4 | 11 | 26 |
| 5 and 6 | 11 | 24 |
| 7 and 8 | 10 | 21 |
| C4 and C5 | 10 | 50 |
| 9 and 10 | 11 | 57 |
| 11 and 12 | 10 | 43 |
| 13 and 14 | 11 | 28 |
| 15 and 16 | 11 | 32 |
| C6 | 12 | 34.4 |
| 17 | 12 | 52.5 |
| 18 | 11 | 35 |
| 19 | 12 | 31 |

TABLE 8-continued

| Example | Kit Test | 2 minute Cobb Test, g/m² |
|---|---|---|
| 20 | 10 | 12.5 |
| C7 | 12 | 40.9 |
| 21 | 12 | 50.7 |
| 22 | 12 | 32 |
| 23 | 12 | 26.9 |
| 24 | 12 | 12.1 |

The results summarized in Table 7 show that aqueous blends of ionomers and PVOH can be used as coatings to provide excellent grease resistance and improved water resistance for paper and paperboard substrates. Addition of relatively small amounts of PVOH to ionomer dispersions can dramatically improve grease resistance. The best results were provided by aqueous dispersions of ION-2 with PVOH-9, which has a hydrolysis level of 95-97% and 4 weight % aqueous viscosity at 20° C. of 25 to 30 cp.

What is claimed is:

1. A method to form a coating comprising a blend of ionomer and poly(vinyl alcohol) on a substrate, the method comprising
    (1) providing a blend composition comprising
        (a) about 99 to about 1 weight %, based on the combination of (a) and (b), of a poly(vinyl alcohol) composition comprising a poly(vinyl alcohol) characterized by
            (i) a hydrolysis level of from about 85 to about 93 mol % and a 4 weight % aqueous viscosity at 20° C. of 15 centipoise (cp) or less; or
            (ii) a hydrolysis level of about 95 mol % to 100%; and
        (b) about 1 to about 99 weight %, based on the combination of (a) and (b), of an ionomer composition consisting essentially of-a parent acid copolymer that consists essentially of copolymerized units of ethylene and about 18 to about 30 weight % of copolymerized units of acrylic acid or methacrylic acid, based on the total weight of the parent acid copolymer, the acid copolymer having a melt flow rate (MFR) from about 200 to about 1000 g/10 min., measured according to ASTM D1238 at 190° C. with a 2160 g load, wherein about 50% to about 70% of the carboxylic acid groups of the copolymer, based on the total carboxylic acid content of the parent acid copolymer as calculated for the non-neutralized parent acid copolymer, are neutralized to carboxylic acid salts wherein the cations consist essentially of potassium cations, sodium cations or combinations thereof; wherein the blend composition is provided in the form of an aqueous dispersion comprising water and about 0.001 to about 50 weight % of the combination of (a) and (b) without the use of aqueous sodium hydroxide, aqueous potassium hydroxide or ammonia during the dispersion process;
    (2) providing a substrate;
    (3) coating the blend composition onto the substrate as the aqueous dispersion; and (4) drying the coated substrate at a temperature of about 20 to about 150° C.

2. The method of claim 1 comprising an ionomer wherein the cations of the carboxylate salts consist essentially of sodium cations.

3. The method of claim 1 comprising an ionomer wherein the cations of the carboxylate salts consist essentially of potassium cations.

4. The method of claim 1 wherein (b) is present in the combination of (a) and (b) in an amount from about 10 to about 95 weight %, (a) being present in a complementary amount.

5. The method of claim 1 wherein (b) is present in the combination of (a) and (b) in an amount from about 60 to about 95 weight %, (a) being present in a complementary amount.

6. The method of claim 1 wherein the poly(vinyl alcohol) is characterized by a hydrolysis level of from about 85 to about 93 mol % and a 4 weight % aqueous viscosity at 20° C. of 15 cp or less.

7. The method of claim 1 wherein the poly(vinyl alcohol) is characterized by a hydrolysis level of about 95 to 100 mol %.

8. The method of claim 1 wherein the acid copolymer has a MFR from about 250 to about 400 g/10 min.

9. The method of claim 1 wherein the acid copolymer is an ethylene methacrylic acid dipolymer having about 18 to about 25 weight % of copolymerized units of methacrylic acid.

10. The method of claim 1 wherein the ionomer composition has a MFR from about 1 to about 20 g/10 min.

11. The method of claim 1 wherein the ionomer composition comprises at least 11 weight % methacrylic acid salt and has a MFR of at least 1 g/10 min.

12. The method of claim 1 wherein the substrate is paper, paperboard, cardboard, pulp-molded shape, textile, material made from a synthetic fiber spun fabric, film, open-cell foam, closed-cell foam, or metallic foil.

13. The method of claim 12 wherein the substrate is paper, paperboard, cardboard, or pulp-molded shape.

14. The method of claim 1 wherein providing the blend composition comprises (1a) providing an aqueous poly(vinyl alcohol) solution comprising water and the poly(vinyl alcohol) composition of (a); (1b) providing an ionomer composition comprising the ionomer composition of (b); (1c) mixing the ionomer composition with the aqueous poly(vinyl alcohol) composition solution optionally with heating; and (1d) optionally cooling the heated aqueous blend dispersion to a temperature of about 20 to 30° C., wherein the combination remains dispersed in the liquid phase.

15. The method of claim 14 wherein (1a) comprises heating a mixture of water and the poly(vinyl alcohol) composition to provide the aqueous poly(vinyl alcohol) solution, optionally followed by cooling to a temperature of about 20 to about 30° C.; and (1b) comprises providing an aqueous ionomer composition by mixing a solid ionomer composition with water heated to a temperature from about 80 to about 100° C. to provide a heated aqueous ionomer composition dispersion; optionally followed by cooling to a temperature of about 20 to about 30° C., wherein the ionomer remains dispersed in the aqueous phase.

16. The method of claim 1 wherein providing the blend composition comprises (1a) heating a mixture of water and a poly(vinyl alcohol) composition to provide an aqueous poly (vinyl alcohol) solution optionally followed by cooling to a temperature of about 20 to about 30° C.; (1b) providing the ionomer composition consisting essentially of the ionomer in solid form; (1c) heating the aqueous poly(vinyl alcohol) solution to a temperature from about 80 to about 100° C. with stirring at atmospheric pressure; (1d) contacting the solid ionomer composition with the heated aqueous poly(vinyl alcohol) solution; (1e) continuing heating at a temperature from about 80 to about 100° C. until the solid ionomer composition has completely dispersed; and (1f) optionally cooling to a temperature of about 20 to 30° C.

17. The method of claim 1 wherein providing the blend composition comprises (1a) heating a combination of the poly(vinyl alcohol) with water to provide an aqueous poly (vinyl alcohol) composition solution; (1b) providing the ionomer composition in solid form; (1c) contacting the solid ionomer composition with the aqueous poly(vinyl alcohol) solution to provide a mixture; (1d) heating the mixture to a temperature from about 80 to about 100° C. until the solid ionomer composition has completely dispersed; and (1e) optionally cooling to a temperature of about 20 to 30° C.

18. The method of claim 16 wherein the solid ionomer composition is in the form of melt cut pellets.

\* \* \* \* \*